(12) United States Patent
Van Mil et al.

(10) Patent No.: US 11,213,016 B2
(45) Date of Patent: Jan. 4, 2022

(54) POULTRY CONTAINER DOOR PANEL, POULTRY CONTAINER DOOR FRAME, POULTRY CONTAINER AND ASSEMBLY OF A POULTRY CONTAINER AND A POULTRY CONTAINER FRONT PANEL

(71) Applicant: MAREL STORK POULTRY PROCESSING B.V., Boxmeer (NL)

(72) Inventors: Johannes Henricus Maria Van Mil, Sint Anthonis (NL); Roger Pierre Hubertus Maria Claessens, Malden (NL)

(73) Assignee: MAREL STORK POULTRY PROCESSING B.V., Boxmeer (NL)

( * ) Notice: Subject to any disclaimer, the term of this patent is extended or adjusted under 35 U.S.C. 154(b) by 118 days.

(21) Appl. No.: 16/345,891

(22) PCT Filed: Oct. 25, 2017

(86) PCT No.: PCT/NL2017/050696
§ 371 (c)(1),
(2) Date: Apr. 29, 2019

(87) PCT Pub. No.: WO2018/084699
PCT Pub. Date: May 11, 2018

(65) Prior Publication Data
US 2019/0274286 A1    Sep. 12, 2019

(30) Foreign Application Priority Data

Nov. 2, 2016 (NL) .................................. 2017708

(51) Int. Cl.
*A01K 31/10* (2006.01)
*A01K 31/06* (2006.01)
(Continued)

(52) U.S. Cl.
CPC ............ *A01K 31/10* (2013.01); *A01K 31/002* (2013.01); *A01K 31/06* (2013.01); *A01K 31/07* (2013.01)

(58) Field of Classification Search
CPC ........ A01K 31/00; A01K 31/02; A01K 31/07; A01K 31/06; A01K 31/10; A01K 31/002
See application file for complete search history.

(56) References Cited

U.S. PATENT DOCUMENTS

| 2,725,087 | A | * | 11/1955 | Potter | B65D 88/522 206/598 |
| 2009/0288613 | A1 | * | 11/2009 | Ho | A01K 1/033 119/482 |
| 2016/0116213 | A1 | * | 4/2016 | Dykes, Jr. | B62D 21/20 296/25 |

FOREIGN PATENT DOCUMENTS

| EP | 1308091 A2 | * | 5/2003 | ............ A01K 45/005 |
| EP | 1308091 A2 | | 5/2003 | |

(Continued)

OTHER PUBLICATIONS

International Search Report and Written Opinion from PCT Application No. PCT/NL2017/050696, dated Nov. 24, 2017.

(Continued)

*Primary Examiner* — Monica L Barlow
*Assistant Examiner* — Aaron M Rodziwicz
(74) *Attorney, Agent, or Firm* — Workman Nydegger

(57) ABSTRACT

The present invention relates to a poultry container door corner part for releasable connection to a container for holding live poultry with two substantially flat panels, rectangularly joined together and forming an elongate corner part with a substantially L-shaped cross-section. The present invention also relates to a poultry container door frame for supporting a poultry container door corner part. Furthermore the invention relates to a poultry container door, comprising (Continued)

a poultry container door corner part and a poultry container door frame, as well as to a poultry container for holding live poultry.

13 Claims, 4 Drawing Sheets

(51) Int. Cl.
*A01K 31/07* (2006.01)
*A01K 31/00* (2006.01)

(56) References Cited

FOREIGN PATENT DOCUMENTS

| GB | 2026985 A | * | 2/1980 | ............. B65D 88/14 |
| GB | 2026985 A | | 2/1980 | |
| JP | H10153973 A | | 6/1998 | |
| WO | 2004045342 A1 | | 6/2004 | |
| WO | 2016064270 A1 | | 4/2016 | |
| WO | WO-2016064270 A1 | * | 4/2016 | ........... A01K 31/002 |

OTHER PUBLICATIONS

Netherlands Search Report from NL Application No. 2017708, dated Jul. 14, 2017.

* cited by examiner

POULTRY CONTAINER DOOR PANEL, POULTRY CONTAINER DOOR FRAME, POULTRY CONTAINER AND ASSEMBLY OF A POULTRY CONTAINER AND A POULTRY CONTAINER FRONT PANEL

BACKGROUND

The present invention relates to a poultry container door corner part for releasable connection to a container for holding live poultry and to a poultry container door frame for supporting a poultry container door corner part. Furthermore the invention relates to a poultry container door, comprising a poultry container door corner part and a poultry container door frame, as well as to a poultry container for holding live poultry.

During storage and transport of poultry (for instance on a poultry farm, from a poultry farm to another poultry farm, on a transport vehicle, from a poultry farm to a slaughterhouse or on a slaughterhouse) the poultry is usually held or transported alive in poultry holders. One such poultry holder is normally designed to hold plural animals in the order of magnitude of a dozen or several dozen of animals. These poultry holders are also referred to as "pallets", "crates", "cages" or "containers". For easy logistics a plurality of such poultry holders may be combined in a shared support structure that makes it possible to stack the poultry holders compact and to displace a support structure with the several holders as a single unit. A support structure may consist of a steel frame in which a number of poultry holders are held in stacked (multilayer) manner and from which the poultry holders can be wholly or partially removed, and can thus for instance be embodied such that they can slide optionally fully into and out of the support structure, similarly to drawers in a chest of drawers. Another possibility is to integrate the poultry holders with the support structure so that this latter comprises compartments provided with individually controllable closing means.

As an alternative also plural individual containers may be used that may be stacked onto each other to be combined to a container assembly of a desired height. In practise use may be made of containers assemblies with stacks of for instance four, five or six container stacked onto each other. Each individual container containing live poultry of a container assembly is covered by the container segment placed on top of that container except for the upper most container of the container assembly that has a container cover.

The poultry container is provided with a poultry container door to provide access to a structure below the poultry container, e.g. for loading or emptying a poultry container underlying a poultry container that may be opened using the poultry container door. The poultry container door is formed by a section of one of the side walls and a, with the side wall section connected, section of the bottom wall. This poultry container door is moveably connected with the rest of the poultry container such that the poultry container door is displaceable between a position wherein the door fits the rest of the container and a position wherein the poultry container door leaves an opening in the side wall and the bottom for the passage of poultry. The poultry container door formed by a section of one of the side walls and a therewith connected section of the bottom wall provides a relative stable structure of the poultry container as at least three of the side walls may be constructed as uniform (solid) construction elements. Furthermore the poultry container door is due to its "single side wall construction" relatively easy to control and may be handled with a single hand. The poultry container door of the poultry container may also be used in circumstances wherein one or both of the sides of the poultry container are resting against other items (e.g. another poultry container). By opening the poultry container door, that means by bringing the poultry container door in a position wherein the poultry container door leaves an opening in the side wall and the bottom for the passage of poultry, poultry may be loaded to a portion below the opened poultry container. In case the poultry container is stacked onto another poultry container the lower poultry container may be loaded with live poultry when de poultry container door of the higher poultry container is opened and the poultry container door of the lower poultry container is closed.

The poultry holders, or poultry containers, are often reused, and undergo various processing steps. During these processing steps the poultry containers are often roughly handled which leads to various physical contact with the poultry containers, especially the poultry container doors are susceptible to wear and damage. Furthermore the use of the poultry containers also may lead to a chemical load on the poultry containers (for instance due to the poultry droppings and/or cleaning products used).

SUMMARY

It is an object of the present invention to provide a poultry container door that is robust but also easy to repair in case of damage and/or wear. A further object of the present invention is to provide a poultry container door that is easy to personalise or to adapt to specific conditions.

The invention provides for this purpose a poultry container door corner part for releasable connection to a container for holding live poultry, comprising two substantially flat panels, rectangularly joined together and forming an elongate corner part with a substantially L-shaped cross-section, wherein the panels are provided with apertures, and wherein at least one of the panels also includes at least one open groove for holding a door frame profile section.

A releasable poultry container door corner part enables to exchange poultry container door corner parts in case of damage to a poultry container door. The doors of poultry containers are sensitive to wear and damage as they are sensitive to sideward en bottom-up impacts, furthermore the poultry container door is moveably (slideably and/or pivotably) connected to the rest of the poultry container. For instance the forks of a fork lift handling poultry containers may damage a poultry container door when a handling operation is less accurate. Furthermore the poultry container door may be made out of a lighter material than the basic structure (like a frame) of the poultry container as the poultry container door has to provide less constructive strength to the poultry container. The poultry container door may thus be of lighter construction than the basic construction of the poultry container, however this makes the poultry container door a vulnerable part of the poultry container.

A further advantage of a releasable poultry container door corner part is that the poultry container doors may be "personalised". For instance the colour and or print on the poultry container door corner parts may be varied. It is also possible to adapt to poultry container door corner parts to specific conditions of use, for instance poultry container door corner parts with less ventilation openings in colder conditions (colder locations and/or colder season) and more openings in warmer conditions (warmer locations and/or warmer season). It is also possible to choose for heavier poultry container door corner parts in extreme conditions, as well as the other way around.

These advantages are realised according to the invention with a releasable poultry container door corner part having two substantially flat panels, rectangularly joined together and forming an elongate corner part with a substantially L-shaped cross-section. Such "corner part" is provided with apertures, to provide aeration of the internal side of the poultry container. The at least one open groove for holding a door frame profile section may be of simple construction and is provided to accommodate a bar or rod (also referred to more generic as "profile section") of a support structure (frame) that provides stability to the poultry container door. Furthermore also the locations of the poultry container door that are most subjected to wear or because of specific function (e.g. guide surface with sliding contact) may be formed by the frame (support structure). When a poultry container door corner part has to be exchanged for another one the frame (support structure) of the poultry container door may be disconnected from the poultry container door corner part and reconnected with the replacing poultry container door corner part. This minimises the volume and cost of the part to be replaced. Furthermore it makes the poultry container door corner part simple in production as it may be made out of a single material, even in a single production process and/or as a single construction element.

At least one of the panels may be provided with coupling elements, preferably protruding coupling elements, for instance cylindrical coupling elements. Such coupling elements enable to provide a solid coupling of the poultry container door corner part and a poultry container door frame.

The open groove may be parallel to the longitudinal direction of the elongate corner part, that is to say that the open groove is parallel to the longitudinal direction of the corner between the panels. Especially in this longitudinal direction additional support to the poultry container door corner part is desired. For a simple assembly of the poultry container door corner part and a frame profile section of the poultry container door frame the open groove may be provided with an open longitudinal side. In a specific embodiment the width of open longitudinal side of the groove is smaller than the width of the groove, providing a narrow entrance to a frame profile section. After passage of the smaller passage opening the frame profile section enters the wider groove. This feature enables a "form fitting" connection of the frame profile section of the poultry container door frame with the poultry container door corner part limiting the chance of uncontrolled release. To minimise the material requirement of the poultry container door corner part, which also supports a lighter construction and thus an easier use, the groove may be defined by plural fins oriented perpendicular to the longitudinal direction of the elongate corner part. Such groove construction results in a substantially open groove, with only on various locations contact between the poultry container door corner part and the frame profile section of the poultry container door frame. Due to the poultry container door frame the poultry container door corner part may be made out of a synthetic material, combining advantages of easy production (e.g. moulding), durability and light weight.

The poultry container door corner part may also comprise at least one reinforcement rib, for instance a reinforcement rib connecting opposite circumferential sides of the poultry container door corner part. Such construction provides additional constructive strength.

The present invention also provides a poultry container door frame for supporting a poultry container door corner part according the present invention, comprising a door frame profile section for introduction in the groove of the poultry container door corner part. The advantages of combining the poultry container door corner part with a poultry container door frame have been mentioned above in relation to the poultry container door corner part and are here incorporated by reference in relation to the poultry container door frame. For a more solid and/or stable assembly the frame may comprise counter-couplings for cooperation with the coupling elements of the poultry container door corner part. In an embodiment that is relative simple of construction the counter-couplings of the poultry container door frame may be formed by the contours of openings in the poultry container door frame.

The present invention also provides a poultry container door, comprising a poultry container door corner part according the present invention and as disclosed above and a poultry container door frame according the present invention and also as disclosed above, wherein a door frame profile section is held by the groove of the poultry container door corner part and the coupling elements of the poultry container door corner part are coupled with the counter-couplings of the poultry container door frame. Protruding coupling elements of the poultry container door corner part may be held by contours of openings of the counter-couplings in the poultry container door frame, which protruding coupling elements of the poultry container door corner part may subsequently secured in the contours of openings of the counter-couplings by quick-lock fasteners. These fasteners are simple, easy to use and cheap and are also known as "push on fasteners" or "fixing washers" for instance commercially available as "star lock"-fasteners.

Finally the present invention also provides a poultry container for holding live poultry, comprising: a bottom wall and four side walls protruding from the bottom wall, including the poultry container door of the present invention.

BRIEF DESCRIPTION OF THE DRAWINGS

The invention will be further elucidated herein below on the basis of the non-limitative exemplary embodiments shown in the following figures. Herein.

DETAILED DESCRIPTION OF VARIOUS EMBODIMENTS

Figure 1:
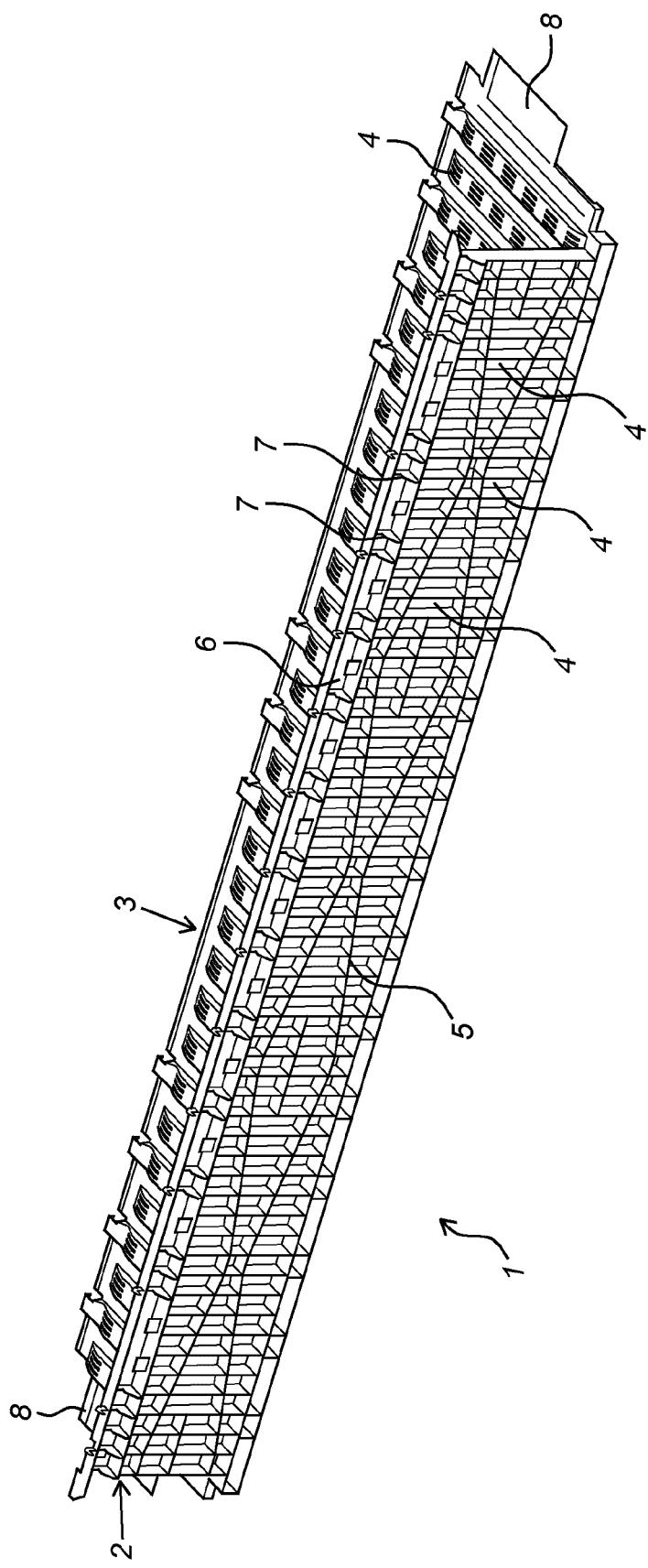
FIG. 1 shows a perspective schematic view on a poultry container door corner part according to the present invention.

FIG. 1 shows a poultry container door corner part 1 having two substantially flat panels 2,3, a front panel 2 and a bottom panel 3. These panels 2,3 are rectangularly joined together (the substantially L-shaped cross-section is also seen from the sides of the poultry container door corner part 1). The substantially flat panels 2,3 are provided with apertures 4 for aeration of the poultry to be held in a container. As seen in the front panel 2 reinforcement ribs 5 are provided that enhance the constructive strength of the poultry container door corner part 1. In this FIG. 1 the poultry container door corner part 1 is illustrated in a situation wherein it is not coupled to a supporting frame or the rest of a poultry container. The front panel 2 is also provided with an open groove 6 (open to the front in the pictured representation) that is to be used for housing a profile section of a poultry container door frame (the poultry container door frame is not shown in this figure). The groove 6 is created by fins 7 (vertical ribs in FIG. 1). Also attention is drawn to the flaps 8 that are part of the bottom panel 3 which are provided with coupling elements which will be discussed in relation to FIGS. 4A and 4B.

Figure 2:
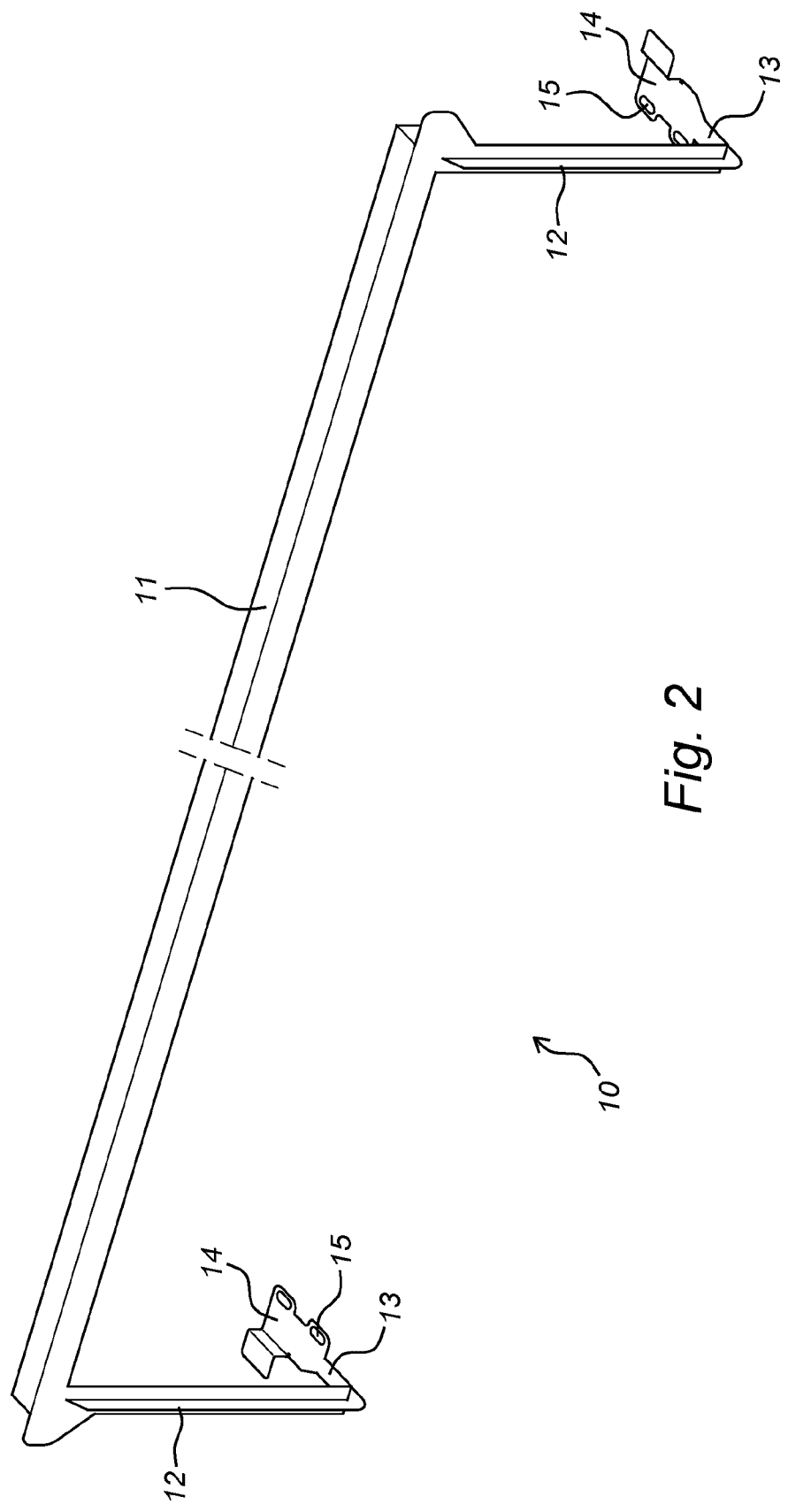
FIG. 2 show a perspective schematic view on a poultry container door frame according to the present invention.

FIG. 2 shows a poultry container door frame 10 for supporting a poultry container door corner part 1 as shown in FIG. 1. The poultry container door frame 10 comprises a profile section 11 that fits the groove 6 in the poultry container door corner part 1 as shown in FIG. 1. The spatial structure of the poultry container door frame 10 of the profile section 11, front panel bars 12 and bottom bars 13 substantially follows a part of the external borders of the poultry container door corner part 1. The bottom bars 13 carry coupling plates 14 with openings 15 the contours of openings of which openings will cooperate with coupling elements as protruding from the flaps 8 of the bottom panel 3 as illustrated in FIG. 1.

Figure 3:
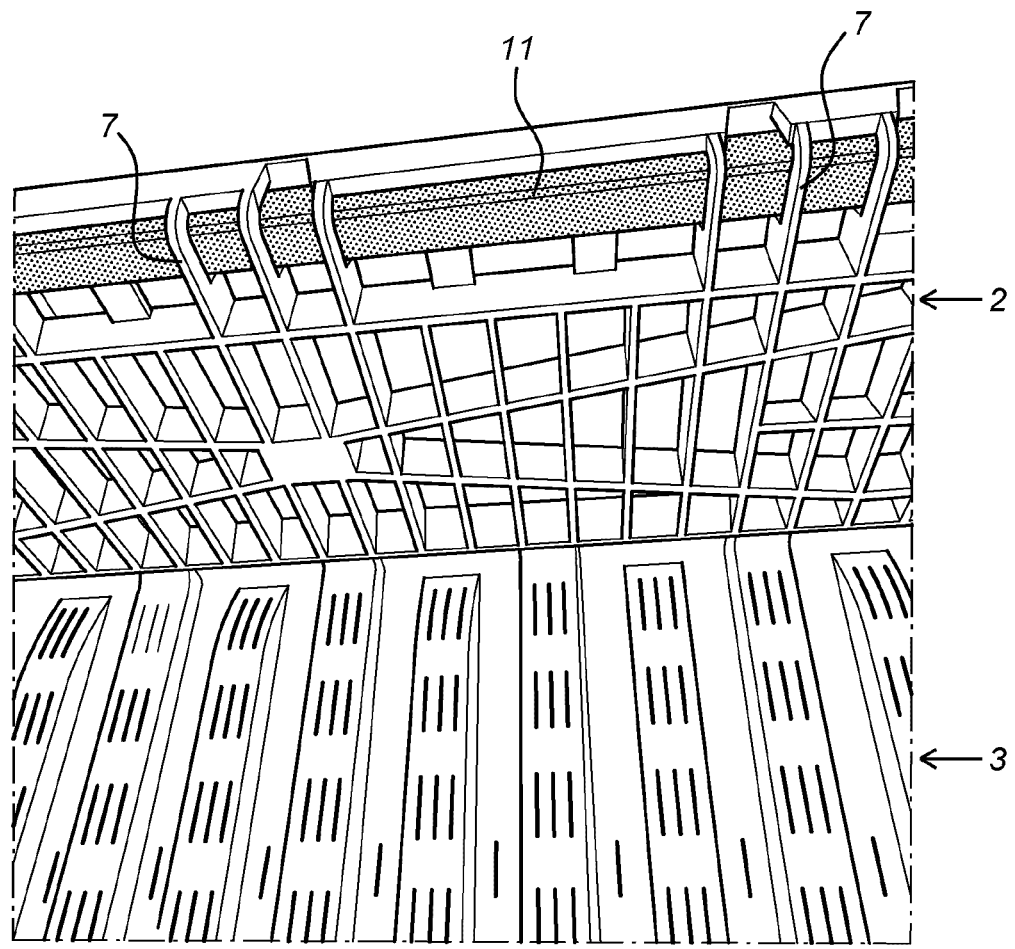
FIG. 3 a detailed perspective view on a part of a poultry container door corner part holding a poultry container door frame profile section.

FIG. 3 shows a part of a poultry container door corner part 1 as illustrated in FIG. 1 holding a poultry container door frame profile section 10 as illustrated in FIG. 2. Profile section 11 is allocated in the groove 6 of the front panel 2. Also visible is that front panel 2 and bottom panel 3 are connected as a single material part. The groove 6 in the front panel 2 is created by fins 7.

Figure 4A:
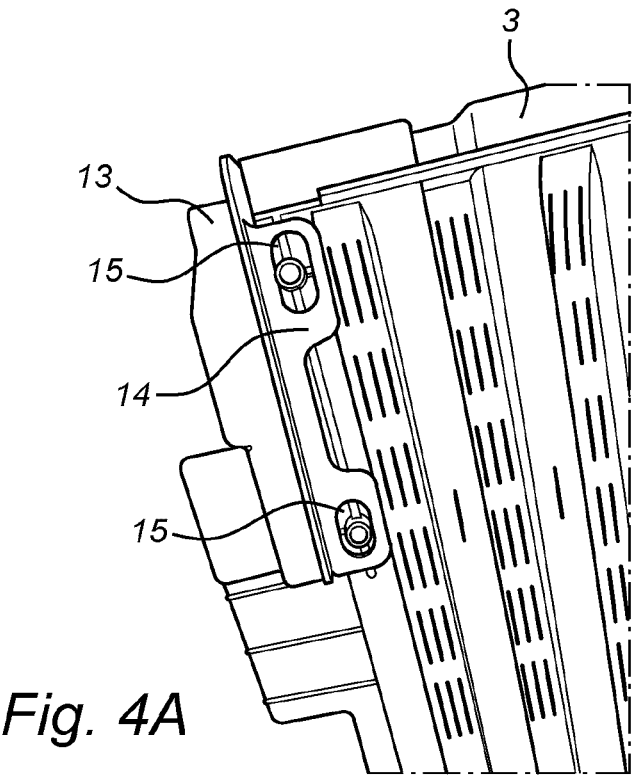
FIGS. 4A and 4B illustrate another part of a poultry container door corner part holding connecting to a poultry container door frame profile section.
Figure 4B:
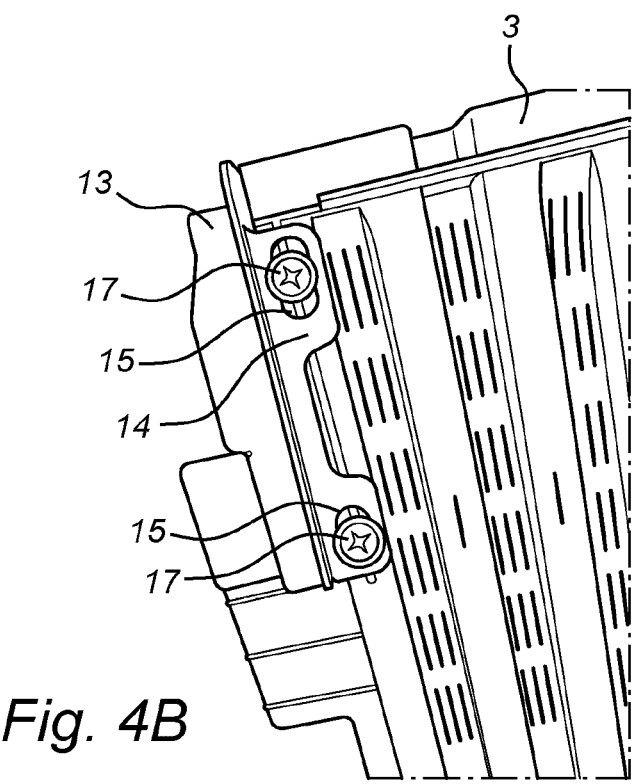

FIGS. 4A and 4B show another detailed view on a poultry container door corner part 1 than FIG. 3, more specific a bottom bars 13 carrying a coupling plate 14 with openings 15. The openings 15 hold projecting coupling elements 16 that protrude from the lower side of the bottom panel 3. In FIG. 4B also fixing washers 17 are represented that are pushed on the projecting coupling elements 16 to provide a secure coupling between the poultry container door corner part 1 and the poultry container door frame 10.

The invention claimed is:

1. A poultry container door for a container for holding live poultry, the poultry container door comprising:
   two substantially flat panels, rectangularly joined together and forming an elongate corner part with a substantially L-shaped cross-section,
   wherein the two substantially flat panels are provided with apertures,
   wherein at least one of the two substantially flat panels also includes at least one open groove for holding a door frame profile section of a door frame;
   wherein the door frame has first and second ends, and first and second front panel bars each having first and second ends, the first ends of the first and second front panel bars connecting to the first and second ends of the door frame profile section and extending perpendicularly from the door frame profile section, first and second bottom bars extending perpendicularly from the second ends of the first and second front panel bars and arranged to follow a part of an external border of the substantially L-shaped cross-section of the substantially flat panels, the first and second bottom bars carrying coupling plates having openings cooperating with coupling elements protruding from a bottom panel of one of the two substantially flat panels.

2. The poultry container door according to claim 1, wherein the coupling elements are cylindrical.

3. The poultry container door according to claim 1, wherein the at least one open groove is parallel to a longitudinal direction of the elongate corner part.

4. The poultry container door according to claim 1, wherein the at least one open groove is provided with an open longitudinal side.

5. The poultry container door according to claim 4, wherein a width of the open longitudinal side of the at least one open groove is smaller than a width of the at least one open groove.

6. The poultry container door according to claim 1, wherein the at least one open groove is defined by a plurality of fins oriented perpendicular to a longitudinal direction of the elongate corner part.

7. The poultry container door according to claim 1, wherein the poultry container door corner part is made out of a synthetic material.

8. The poultry container door according to claim 1, wherein the poultry container door corner part is moulded as a single construction element.

9. The poultry container door according to claim 1, wherein the poultry container door corner part comprises at least one reinforcement rib.

10. The poultry container door frame according to claim 1, wherein counter-couplings of the poultry container door frame are formed by contours of openings in the poultry container door frame.

11. A poultry container door, comprising:
    a poultry container door corner part for releasable connection to a container for holding live poultry, including two substantially flat panels, rectangularly joined together and forming an elongate corner part with a substantially L-shaped cross-section,
    wherein the two substantially flat panels are provided with apertures, and
    wherein at least one of the two substantially flat panels also includes at least one open groove for holding a door frame profile section; and
    a door frame comprising the door frame profile section for introduction in the at least one open groove of the poultry container door corner part;
    wherein the door frame has first and second ends, and first and second front panel bars each having first and second ends, the first ends of the first and second front panel bars connecting to the first and second ends of the profile section and extending perpendicularly from the door frame profile section, first and second bottom bars extending perpendicularly from the second ends of the first and second front panel bars and arranged to follow a part of an external border of the substantially L-shaped cross-section of the substantially flat panels;
    wherein the door frame profile section is held by the at least one open groove of the poultry container door corner part and coupling elements of the poultry container door corner part are coupled with counter-couplings of the poultry container door frame at the first and second bottom bars;
    wherein the at least one open groove is defined by a plurality of fins oriented perpendicular to a longitudinal direction of the elongate corner part.

12. The poultry container door according to claim 11, wherein the coupling elements of the poultry container door corner part are held by contours of openings of the counter-couplings in the poultry container door frame.

13. The poultry container for holding live poultry, comprising:
a bottom wall and four side walls protruding from the bottom wall, including a poultry container door according to claim 11.

\* \* \* \* \*